Oct. 14, 1958 B. GARRISON 2,856,251
ADJUSTABLE TRAY FOR AUTOMOBILE STEERING WHEEL
Filed May 28, 1957
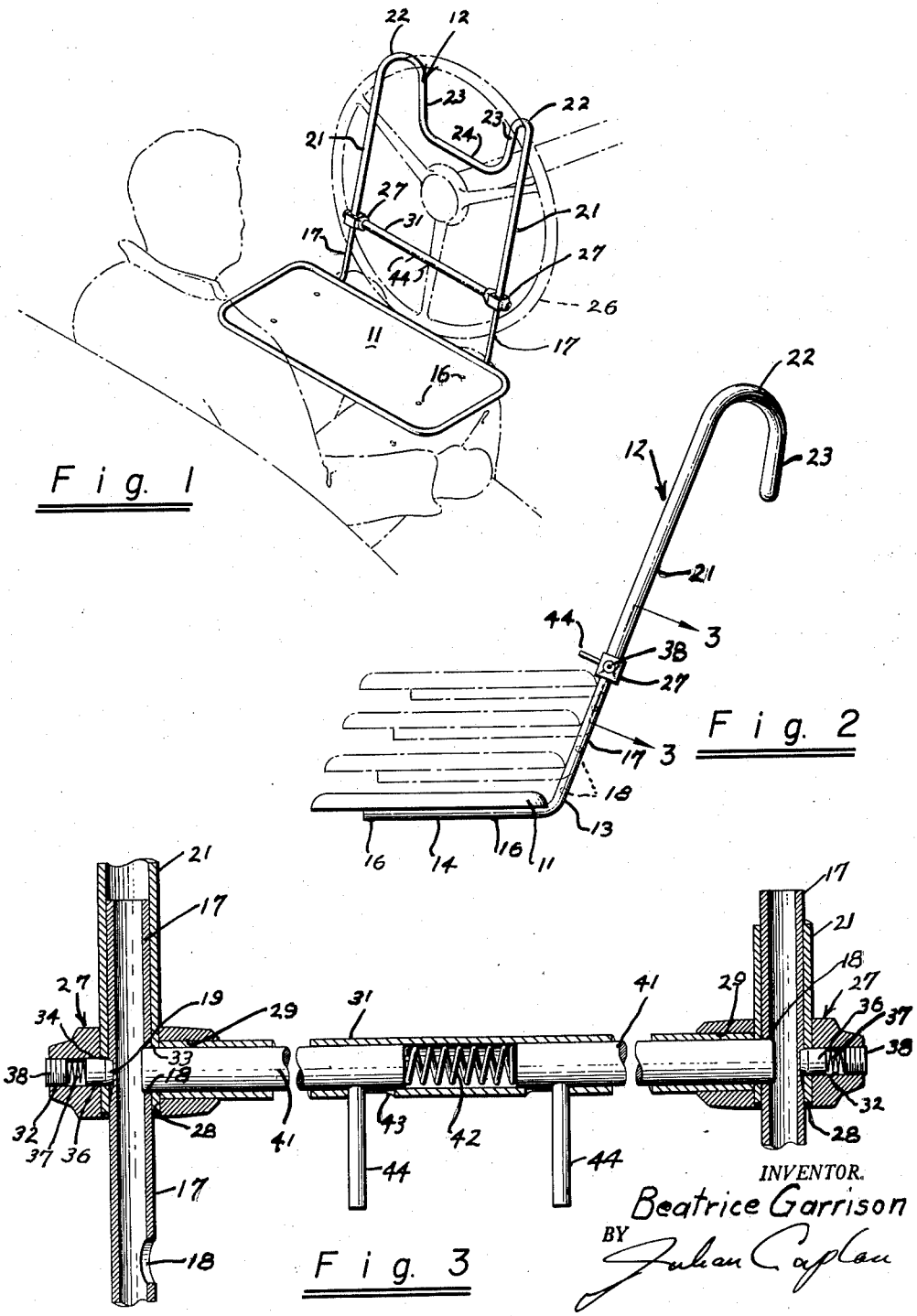
INVENTOR.
Beatrice Garrison
BY United States Patent Office 2,856,251
Patented Oct. 14, 1958

2,856,251

ADJUSTABLE TRAY FOR AUTOMOBILE STEERING WHEEL

Beatrice Garrison, Mountain View, Calif.

Application May 28, 1957, Serial No. 662,220

3 Claims. (Cl. 311—21)

This invention relates to a new and useful adjustable tray for comestibles for use in drive-in restaurants and the like, the tray being adapted to be suspended from the steering wheel of a vehicle or other convenient location.

The principal object of the present invention is to provide a convenient means for attaching a tray by suspension from the steering wheel of a vehicle.

One of the advantages of the invention is the fact that the steering wheel may be turned in any direction without interfering with suspension of the tray.

Still another feature of the invention is the fact that the elevation of the tray relative to the steering wheel is adjustable, so that the tray extends over the lap of the driver and is located at a convenient height.

Still another feature of the invention is the rapidity and convenience with which the elevation of the tray may be adjusted.

Other objects of the present invention will become apparent upon reading the following specification and referring to the accompanying drawings in which similar characters of reference represent corresponding parts in each of the several views.

In the drawings:

Fig. 1 is a perspective view showing the device installed on the steering wheel of a vehicle;

Fig. 2 is an enlarged side elevation showing in dot and dash lines the different positions of adjustment of the tray; and Fig. 3 is a fragmentary enlarged sectional view taken substantially along the line 3—3 of Fig. 2 with the center portion rotated 90° from its actual position to facilitate understanding of the invention.

The present invention comprises essentially two parts, namely, a tray 11 and a hanger 12 which are adjustable relative to each other by means hereinafter described in detail. Tray 11 is provided with a pair of bracket members 13 consisting of two parts disposed at oblique angles relative to each other. One such part of bracket 13 is a horizontal stretch 14 which extends under tray 11 and is secured thereto by means of rivets 16 passing through tray 11 and stretch 14. The upper stretch 17 of hanger 12 is formed with a plurality of adjustment holes 18 facing inwardly and horizontally aligned relative to each other. Upper stretch 17 is also provided adjacent its upper end with a slanted flat surface 19 immediately opposite the uppermost hole 18 and on the outside of member 17.

Hanger 12 is formed of tubular stock of slightly larger diameter than bracket 13 so that upper end 17 of bracket 13 may slide therein. In front elevation hanger 12 is generally in the shape of an inverted U and in side elevation is hook-shaped. Accordingly the hanger comprises a pair of downwardly extending legs 21 which are parallel to each other and the lower ends of which receive stretches 17 of bracket 13. At the upper ends of legs 21 are rearwardly bent arcuate portions 22, which in side elevation have an arcuate length of approximately 180°, but also, as best shown in Fig. 1, turn inwardly.

Arcuate sections 22 terminate in short, downwardly directed legs 23 which are joined together at their lower ends by transverse connecting portion 24. Preferably portions 21, 22, 23 and 24 form a continuous integral member of tubular stock bent in the desired shape and adapted to hook over a steering wheel 26, as shown in Fig. 1.

The lower end of each leg 21 is provided with a fitting 27 which is generally cylindrical in shape. Fitting 27 is provided with a transverse bore 28 which receives the lower end of leg 21 with a tight fit. The inner end of fitting 27 is formed with an enlarged bore 29 which receives transverse tube 31, the outer ends of which are received in and held by the opposite fittings 27. In alignment with bore 29 but on the opposite end of fitting 27 is a threaded, small diameter bore 32. The lower end of leg 21 is apertured in bores 33 and 34 in registry with bores 29 and 31, respectively. The diameter of hole 33 is equal to the inside diameter of hole 31 and comprises an extension thereof.

Slidable within bore 32 in an axial direction is a plug 36 which is biased inwardly by helical spring 37 held in place in bore 32 by set screws 38 threaded into bore 32. The inner end of plug 36 extends through hole 34 in leg 21 and secures the leg to fitting 27 and also engages slanted flat 19 to prevent leg 17 from being drawn out of the end of leg 21 after tray 11 is extended to the maximum degree of extension relative to hanger 12.

Slidable within the outer ends of transverse tube 31 are rods 41, the outer ends of which extend into the various adjustment holes 18. Rods 41 are biased outwardly by spring 42 bearing against their inner ends. Tube 31 is formed with a pair of axially elongated holes 43 through which extend finger grips 44 which are fastened to the inner ends of rod 41. By gripping finger holds 44 and moving them toward each other against the force of spring 42, the outer ends of rod 41 are drawn out of holes 18 in portions 17 thus permitting portions 17 to slide in an axial direction relative to legs 21 and permitting tray 11 to be adjusted at a convenient height.

In use, the attendant at the drive-in restaurant hooks hanger portion 12 over the top of vehicle steering wheel 26 with connecting portion 24 in back of the wheel and legs 21 and upper stretch 17 of bracket 13 resting on the front of the wheel 26. Thus the device is securely held in position regardless of the degree at which wheel 26 is turned. Thereupon finger holds 44 are gripped and drawn together, disengaging outer ends of rods 41 from holes 18. The tray is then raised or lowered to a comfortable height, whereupon finger grips 44 are released, permitting the ends of rods 41 to seek the nearest adjustment hole 18 whereupon the tray is locked in place. During the adjustment of the tray plugs 36 engaging flat portion 19 prevent tray 11 and hanger 12 from separating.

Although the foregoing invention has been described in some detail by way of illustration and example for purposes of clarity of understanding, it is understood that certain changes and modifications may be practiced within the spirit of the invention and scope of the appended claims.

I claim:

1. An adjustable tray assembly comprising a tray, a pair of upwardly extending brackets fastened to opposite sides of said tray, and a hanger adapted to receive the upper ends of said brackets, the upper end of said hanger being bent to fit around and be suspended from a steering wheel, said hanger having a pair of depending tubular legs in which the upper ends of said brackets are received, the lower end of each said leg having a fitting secured thereto, a transverse tube extending between said fittings, a pair of rods enclosed in said transverse tube, means biasing said rods outwardly into said fittings to engage and restrain movement of said hangers and retracting means to retract said rods from engagement with said hangers.

2. A tray assembly according to claim 1 in which said fitting is provided with a slidable detent and means biasing said detent toward engagement with said hanger and said hanger is formed with a flat having a transverse shoulder against which said detent lodges to limit outward movement of said tray relative to said hanger.

3. An adjustable tray assembly comprising a tray, a pair of brackets fastened to said tray and having upwardly extending portions, at least one said upwardly extending portion being formed with a plurality of holes spaced longitudinally along said portion, a hanger formed to hook over a vehicle steering wheel and having a pair of depending tubular legs slidably receiving the upper ends of said portions, a transverse member extending between the lower ends of said legs, means securing the outer ends of said member to said legs, at least one rod slidable within said member and projectable beyond the outer end of said member, means in said member biasing said rod outwardly into engagement with a hole in said member, a fingerhold on said rod, said member being formed with an elongated aperture through which said fingerhold projects, said hanger being provided with a slidable detent and means biasing said detent toward engagement with one said portion and in which said last-named portion is formed with a depression having a shoulder against which said detent engages to restrain complete withdrawal of said portions from said legs.

References Cited in the file of this patent

UNITED STATES PATENTS

| | | |
|---|---|---|
| 1,576,034 | Butt | Mar. 9, 1926 |
| 2,211,962 | Morris | Aug. 20, 1940 |
| 2,314,550 | Olman | Mar. 23, 1943 |
| 2,500,542 | Greene | Mar. 14, 1950 |
| 2,687,336 | Smith et al. | Aug. 24, 1954 |